F. A. McDANIELS.
TRACTOR CONTROL.
APPLICATION FILED APR. 11, 1917.

1,261,571.

Patented Apr. 2, 1918.
2 SHEETS—SHEET 1.

WITNESSES
L. Haverstein
C. Bradway

INVENTOR
F. A. McDaniels.
BY
ATTORNEYS

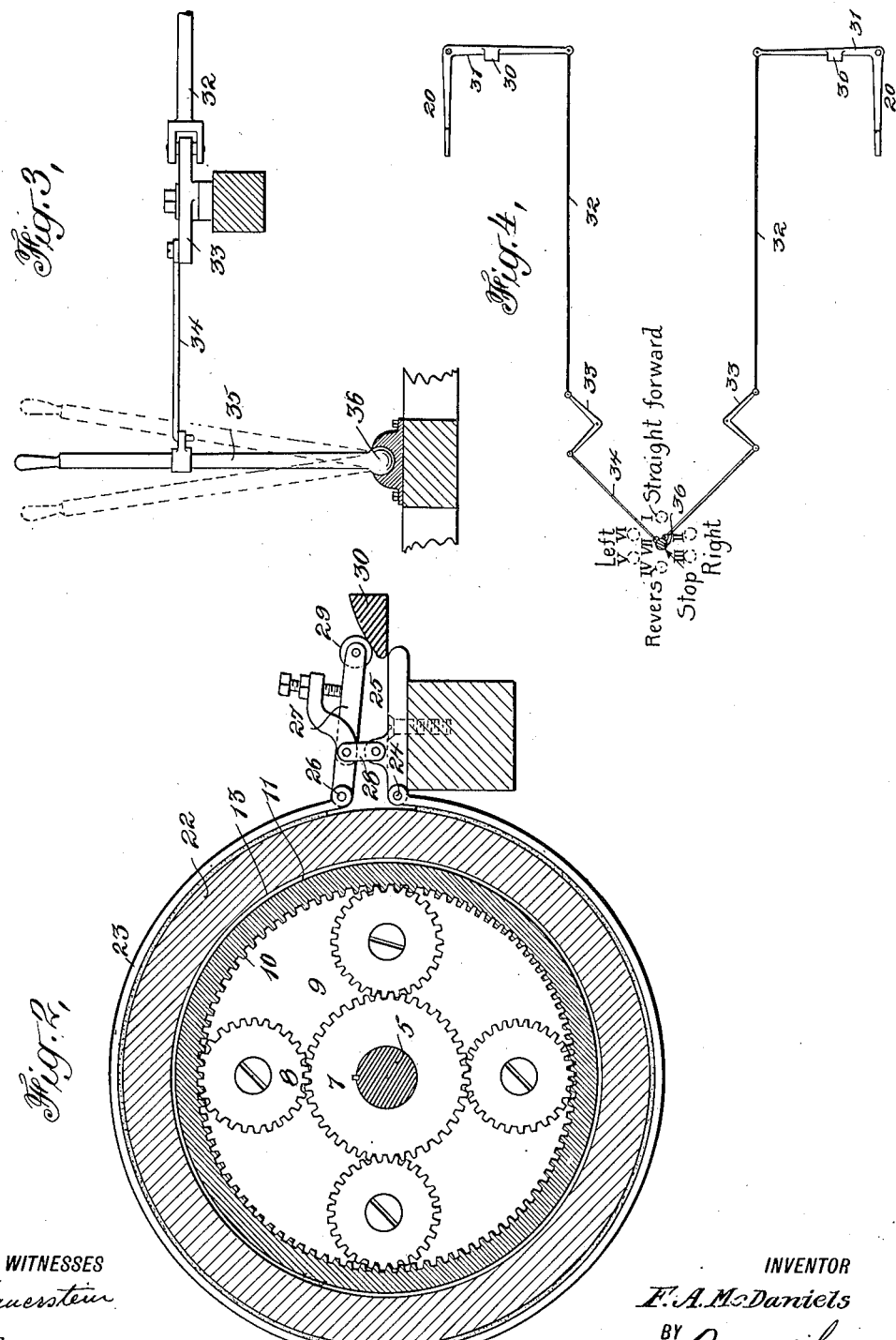

UNITED STATES PATENT OFFICE.

FRANK A. McDANIELS, OF PORTLAND, OREGON.

TRACTOR CONTROL.

1,261,571.     Specification of Letters Patent.     Patented Apr. 2, 1918.

Application filed April 11, 1917. Serial No. 161,171.

*To all whom it may concern:*

Be it known that I, FRANK A. McDANIELS, a citizen of the United States, and a resident of Portland, in the county of Multnomah and State of Oregon, have invented a new and Improved Tractor Control, of which the following is a full, clear, and exact description.

This invention relates to tractors or other self-propelled vehicles, and deals particularly with the operator's control.

The invention has for its general object to provide a comparatively simple and inexpensive controlling mechanism which is reliable and efficient in use and so designed that by means of a single lever movable in various directions the vehicle can be guided as to direction and speed of travel, that is to say, by movements of the lever the vehicle can be driven straight forwardly or straight rearwardly or can be turned to the right or left either forwardly or rearwardly.

A more specific object of the invention is the provision of novel power-transmitting mechanisms between the engine and the traction elements, which mechanisms are controlled by a single lever for producing the results above referred to.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a horizontal section of a portion of a tractor showing the transmitting mechanisms between the engine and caterpillar tractor elements and control means for the mechanisms;

Fig. 2 is a vertical section on the line 2—2, Fig. 1;

Fig. 3 is a side view of the controlling lever;

Fig. 4 is a diagrammatic view of the controlling lever and its connections with the power-transmitting mechanisms.

Figure 1:
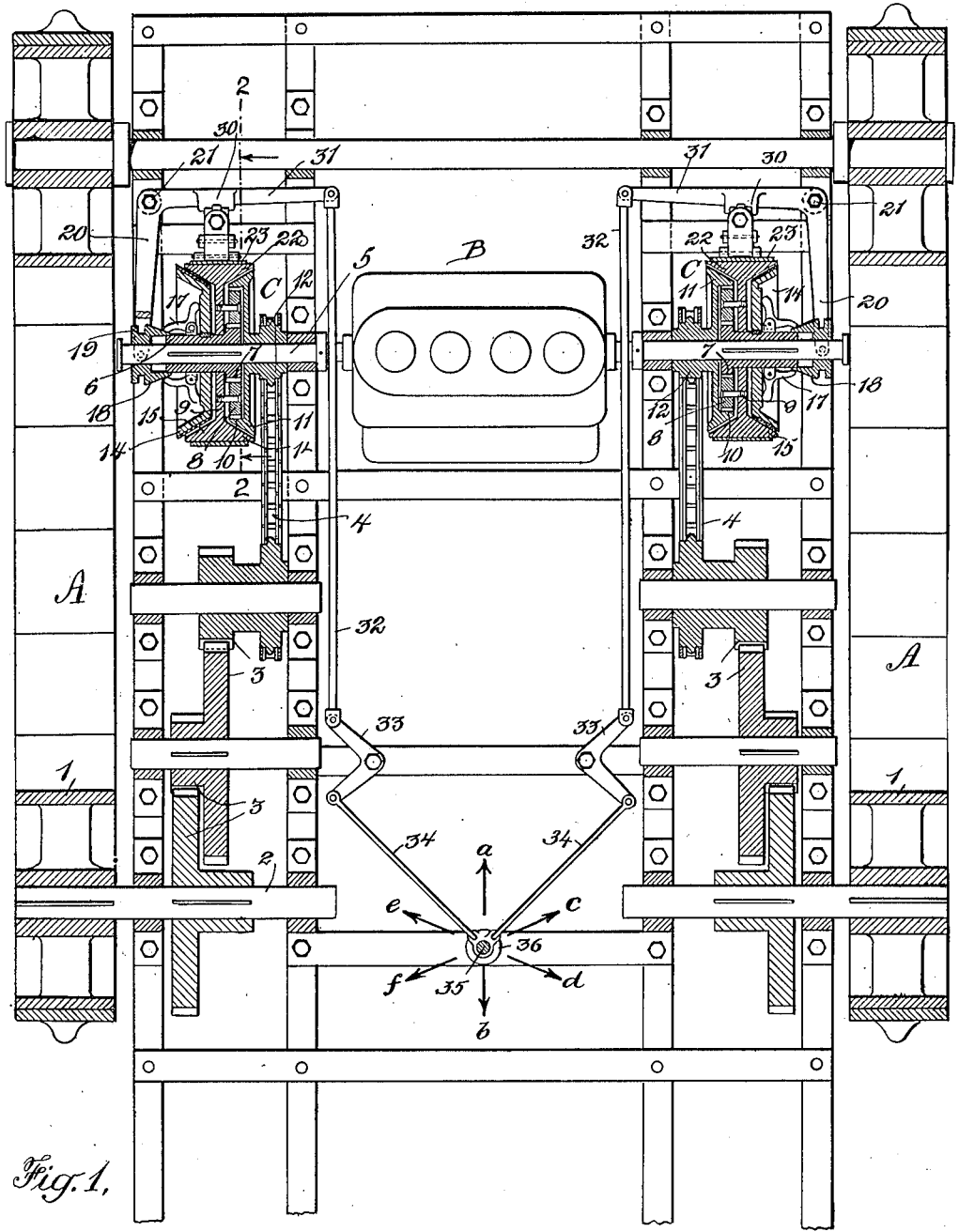

In the present instance traction is obtained by means of caterpillar tractor elements A, although it is to be understood that wheels may be employed. The power is derived from an explosive engine B or other prime mover which operates through transmitting mechanisms C at opposite sides of the engine and each associated with a tractor element.

The driving wheels 1 of the tractor elements A are mounted on their respective axles 2, each of which is driven by a train of gears 3 which may include a sprocket and chain drive 4. The shaft of the engine has extensions 5 to which the mechanisms C are operatively connected. Keyed on the ends of the shaft 5 are sleeves 6, each of which has a gear 7 meshing with idler gears 8 on a disk or carrier 9 which is loose on the sleeve 6. The pinions 8 mesh with the gear teeth 10 of a cone 11 which is loose on the engine shaft and to which the sprocket 12 of the drive 4 is connected. The carrier 9 has a hollow conical surface 13 with which the cone 11 coöperates. Feathered on the sleeve 6 is a friction cone 14 which meshes with a hollow cone 15 on the carrier 9. This cone 14 is moved into gripping engagement with the cone 15 by means of dogs 17 on the sleeve 6, which are actuated by a spreader 18. This spreader has an annular groove 19 for connection with a forked lever 20 which is fulcrumed at 21 on the frame of the machine. The peripheral surface of the carrier 9 forms a brake drum 22 with which coöperates a brake band 23. As shown in Fig. 2, one end of the brake band is connected at 24 with a bracket 25, and the other end is connected at 26 with a lever 27 that is mounted on a link 28 carried by the bracket 25. The lever 27 has a roller 29 with which engages a cam 30 on the arm 31 of the bell-crank lever 21. The bell-crank levers 20 have their arms 31 connected by rods 32 with bell-crank levers 33 fulcrumed on the frame of the machine, and these bell-crank levers 33 are in turn connected by rods 34 with a single controlling lever 35. As shown in Fig. 3, the lower end of this controlling lever is mounted in a ball and socket bearing 36 to provide universal movement of the lever, whereby the vehicle can be caused to travel forwardly or rearwardly or turn forwardly to the right or left or rearwardly to the right or left, simply by moving the lever in the proper directions while the engine B is operating.

When the lever is moved forwardly, as indicated by the arrow *a*, the controller operates the lever 31 in a direction to cause the cones 14 to engage the cones 15, whereby the engine shaft will transmit motion through the cone 14 to the cone 15 with more or less slippage, according to the extent to which the controlling lever is moved forwardly. This causes motion to be transmitted through the planetary gearing formed by the gears 7, 8 and 10, to transmit power to the tractor elements A, to drive the machine forwardly, it being understood that when the levers 20 move the spreaders 18 inwardly to bring about the results mentioned, the brake bands 23 are released. When the controller lever is moved to its fullest extent forwardly the full driving power is transmitted through the mechanism C from the engine to the tractor elements A. When the controller is moved rearwardly, as indicated by the arrow $b$, the spreaders 18 are thrown outwardly so as to free the cones 14 from the cones 15 and the brake bands 23 are tightened so that the carriers 9 will be held stationary, and as a result the pinions 8 rotate on fixed axes and transmit motion in a reverse direction from the engine shaft gears 7 to the toothed cones 11, and consequently the tractor elements A will be driven in a reverse direction. When the controlling lever is moved forwardly and to the right, as indicated by the arrow $c$, the machine will be steered forwardly and to the left, and when the controlling lever is moved rearwardly and to the right, as indicated by the arrow $d$, the vehicle is driven rearwardly and to the right. When the controlling lever is moved in the direction of the arrow $e$, the vehicle is driven forwardly and to the right, and when the controlling lever is moved in the direction indicated by the arrow $f$, the vehicle is moved rearwardly and to the left. It is possible by the movement of the controlling lever to cause forward movement of one tractor A and reverse the movement of the other tractor A, so as to cause turning in a very short radius.

Briefly stated, the shifting of the lever to the various positions I to VII inclusive, Fig. 4, produces the following effects:

Position I drives straight forward
"         II    "     forward to left
"         III   "     rearward to right
"         IV    "     rearward
"         V     "     rearward to left
"         VI    "     forward to right
"         VII   "     stationary.

From the foregoing description taken in connection with the accompanying drawings, the advantages of the construction and method of operation will be readily understood by those skilled in the art to which the invention appertains, and while I have described the principle of operation, together with the machine which I now consider to be the best embodiment thereof, I desire to have it understood that the machine shown is merely illustrative and that such changes may be made when desired as fall within the scope of the appended claims.

Having thus described my invention, I claim as new and desire to secure by Letters Patent:

1. A self-propelled vehicle comprising a body, a pair of tractor elements thereon, a prime mover, power-transmitting mechanisms between the prime mover and each element for forward and reverse driving of the latter, and a single controller for both mechanisms for causing straight forward or rearward travel or forward or rearward turning to the right or left.

2. In a self-propelled vehicle, the combination of a body, tractor elements, a prime mover, power-transmitting mechanisms between each tractor element and the prime mover and each mechanism including separate means for effecting forward or reverse driving of the tractor elements, connections between the said means of each mechanism whereby one means is rendered operative and the other inoperative simultaneously, and a controlling lever mounted for universal movement and connected with the said means of both mechanisms whereby simultaneous forward or reverse driving of the tractor elements or forward driving of one element and reverse driving of the other element simultaneously can be effected.

3. In a self-propelled vehicle, the combination of a body, tractor elements, a prime mover, power-transmitting mechanisms between the prime mover and tractor elements, each mechanism comprising planetary gearing connected with the prime mover and including a cone clutch element, a carrier for the pinions of each planetary gearing and having a cone adapted to coöperate with the first-mentioned cone and having an additional cone, a slidable cone associated with the said additional cone and operatively connected with the prime mover, said carrier forming a brake drum, a brake band engageable with the said drum, a device for moving the last-mentioned cone to gripping position while releasing the brake band, or vice versa, and a single controller movable in different directions and connected with both of said devices to effect simultaneous forward or reverse motion of the tractor elements or forward motion of one element and backward motion of the other simultaneously.

FRANK A McDANIELS.